United States Patent [19]

Card et al.

[11] 4,149,041
[45] Apr. 10, 1979

[54] TELEPHONE APPARATUS

[75] Inventors: Stuart E. Card, Luton; David F. Griffiths, Stevenage, both of England

[73] Assignee: The Post Office, London, England

[21] Appl. No.: 832,997

[22] Filed: Sep. 13, 1977

[30] Foreign Application Priority Data

Sep. 17, 1976 [GB] United Kingdom ............... 38630/76
Feb. 28, 1977 [GB] United Kingdom ................ 8429/77

[51] Int. Cl.² ........................................... H04M 3/62
[52] U.S. Cl. ............................................... 179/27 CA
[58] Field of Search ................ 179/27 CA, 27 FF, 99

[56] References Cited

U.S. PATENT DOCUMENTS

| 3,513,263 | 5/1970 | Bastian et al. | 179/27 CA |
| 3,935,396 | 1/1976 | Barsellotti et al. | 179/99 |
| 3,971,898 | 7/1976 | Hijikata et al. | 179/99 |

Primary Examiner—William C. Cooper
Attorney, Agent, or Firm—Cushman, Darby & Cushman

[57] ABSTRACT

A telephone control console including visual indicator means, data input means, audio frequency input and output means, microprocessor means, data transmission and reception means wherein said microprocessor means controls at least some of said visual indicator means in accordance with data received by said data reception means and in accordance with data input through said data input means and also controls the transmission of data by said data transmission means in accordance with instructions from said data input means and wherein said audio frequency input and output means include an input and output for an operator's telephone.

28 Claims, 7 Drawing Figures

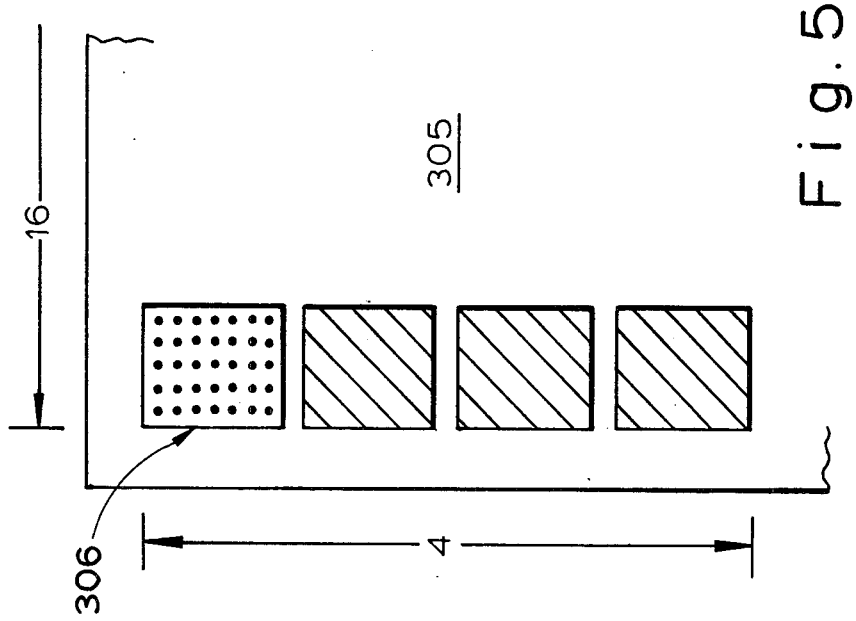
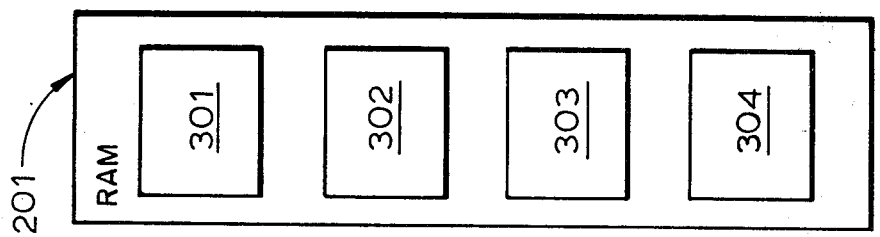
Fig.5.

TELEPHONE APPARATUS

The present invention relates to a telephone control console which may be a subscriber's instrument or, preferably, a PABX operator's console.

Private Automatic Branch Exchanges, commonly abbreviated to PABX, are very well known pieces of equipment, by which telephone calls on the public switched telephone network may be extended to or originated from extensions in a set of offices in a semi-automatic manner. Although direct dialling in, or DDI, can be provided in some cases, very many PABXs rely on an operator to receive incoming calls and to extend them to the extensions. In the past, operators' consoles for use with PABXs have always been designed on an installation independent basis, so that the range of facilities available to the operator is common to all installations. However, modern types of PABX can increasingly provide sophisticated facilities, especially for the operator. Since any one installation may not wish to make use of all the facilities that are potentially available, it therefore becomes important to be able to tailor the facilities, and the console, to those required: thus a more flexible design of operator's console is very desirable.

The facilities offered to extension users on a modern type of PABX have also increased in recent years, and it has become necessary to provide means for the control of these facilities at extensions. It is therefore very desirable that a flexible design of console can be provided for the extension user, such as an executive who requires access to several advanced facilities.

According to a first aspect of the present invention there is provided a telephone control console including visual indicator means, data input means, audio frequency input and output means, microprocessor means, and data transmission and reception means, wherein said micro-processor means controls at least some of said visual indicator means in accordance with data received by said data reception means and in accordance with data input through said data input means and also controls the transmission of data by said data transmission means in accordance with the instructions from said data input means, and wherein said audio frequency input and output means includes an input and output for an operator's telephone.

According to a second aspect of the present invention there is provided a telephone control console including a signalling keypad for setting up telephone connections, a micro-processor, an address bus and a data bus, each said bus interconnecting said micro-processor and said keypad so that the signalling output of the said keypad is by way of said data bus and is at least partially controlled by signals from said micro-processor to said keypad by way of said address bus.

According to a third aspect of the present invention there is provided a data store for storing data to be displayed by a visual display unit in a telephone control console, comprising a plurality of random access memories such that in each random access memory there is a plurality of storage locations each said storage location having a storage capacity of n bits, where n may be different for different random access memories and is greater than 1, said storage location being arranged into sub-portions within each random access memory, so that in use an output word can be assembled on to an output register by transferring data in parallel from storage locations in first corresponding sub-portions in each said memory on to said output register, and sequentially transferring further data in parallel from second and further corresponding portions in each said memory.

According to a further aspect of the present invention there is provided a data store for storing data to be displayed by a visual display unit in a telephone control console comprising a plurality of pairs of random access memories, each of said memories having a plurality of addressable storage locations, arranged in pairs such that the addresses of the locations in each pair differ only in the most significant bit of the respective addresses, and which in operation is arranged to assemble a parallel plurality of parallel words on an output register, each said word comprising the contents of similarly addressed locations in each pair of memories, adjacent words being sequentially assembled by the alteration only of the most significant bit of the address during the assembly of each said parallel plurality of parallel words.

According to a further aspect of the present invention there is provided a visual display unit control for use with a dot matrix visual display unit in a telephone control console having column and row drives, said column drives actuating the columns of said matrix in a scanning sequence and said row drives actuating the rows of said matrix in accordance with data stored in said control, so that a dot situated at the intersection of an activated row and an activated column is activated, said control including at least a first and a second random access memory to store said data, the output from said memories to said row drives being by way of a register operable to assemble thereon a parallel word comprising four portions, the first portion being from a storage location in the first memory having a first addres, the second portion being from a storage location in the first memory having a second address, the third portion being from a storage location in the second memory having a first address, and the fourth portion being from a storage location in the second memory having a second address, and where said first and second addresses differ only in the most significant bits and where data from locations having the second address is assembled on to the register after data from the locations having the first address, said addresses having the remaining bits selected in a cyclic manner by an address counter synchronized with said column drives.

Preferably said keyboard is operated by the proximity of the human body. It is also preferred that said visual display unit shall be of the electro-luminescent type.

It will be understood that in this Specification the term visual display unit is taken to have its special meaning of a unit having a flat screen upon which may be displayed by electronic control alphanumeric characters chosen from a very wide type set. The term flat is intended to include devices such as television screens within its orbit.

It will be apparent to those skilled in the art that the advantages provided by a console according to the invention can be very wide indeed; and further advantages will become apparent as a particular example is described. It should be pointed out at the start that the console is designed to provide these facilities by the direct communication of the micro-processor within the console and the control unit of the telephone exchange with which the console is associated.

One embodiment of the invention will now be described by way of example with reference to the accompanying drawings in which:

FIGS. 5, 6 and 7 show various aspects of the data storage and in display organization in a visual display unit for use in a PABX operator's console.

Figure 1:
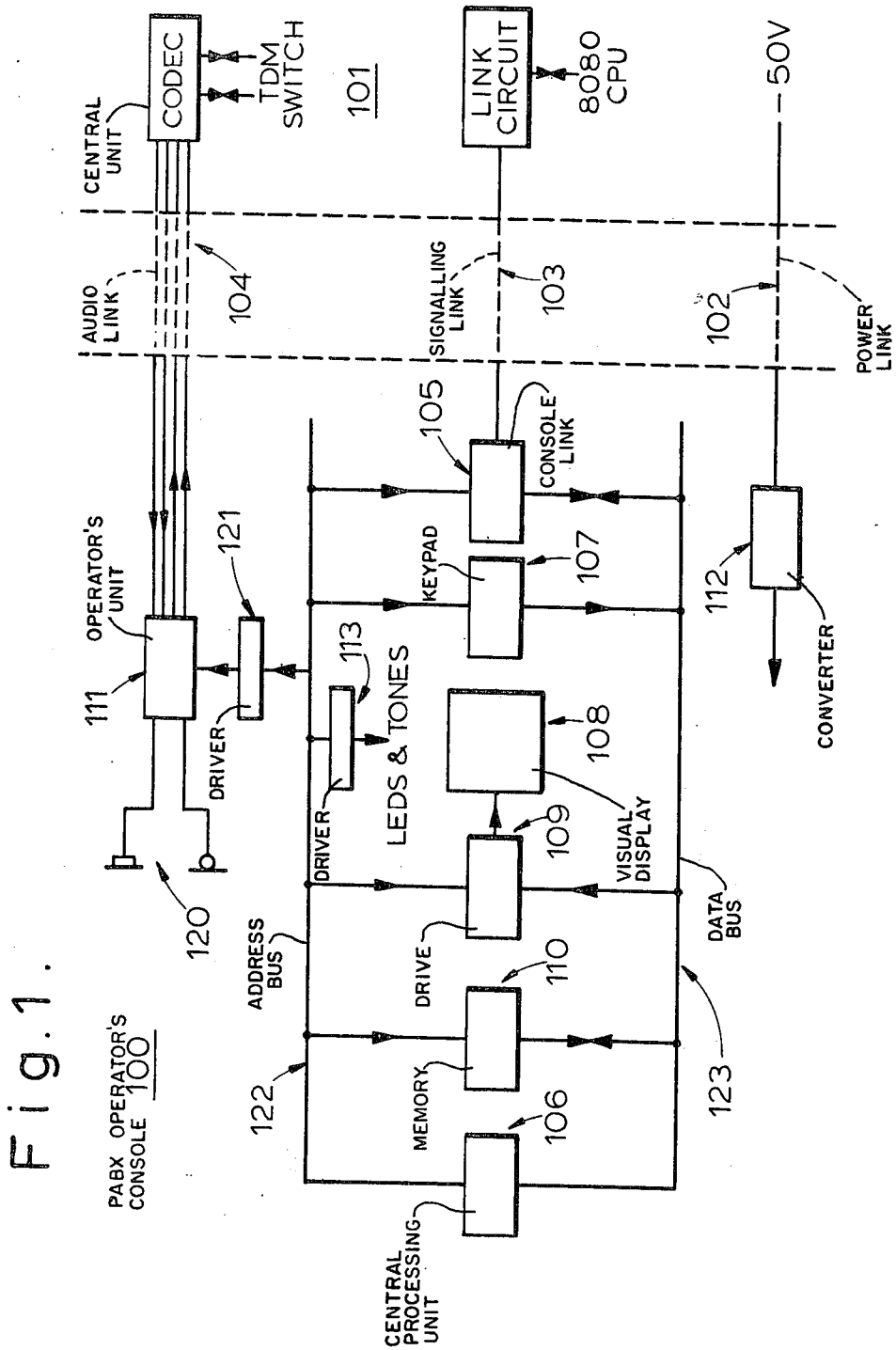
FIG. 1 is a block diagram of a PABX operator's console

It will be assumed for the purposes of this description that the console is to perform the function of an operator's console on a small processor-controlled PABX. Although it is envisaged that the console will only be used with the most modern type of switching systems, it is immaterial whether the switching is in fact space or time. In this description it will be assumed that the PABX uses a time division multiplex switching system. Referring now to the drawings, and FIG. 1 in particular, it will be seen that a console 100 is connected to the central unit of the PABX 101 by three separate links 102, 103, 104. These links are for the transmission of power, signalling information and audio signals respectively. The speech connection 104 comprises two four-wire analogue circuits giving the operator access to two ports in the PABX via the operator's telephone 120 and the operator's unit 111, which latter includes a T-in. The T-in enables the operator to take part in a three-party conversation, for example, with a public exchange caller and a called extension. The operator's T-in is arranged to allow the operator to access either or both of the four-wire speech circuits under the control of the console keypad through the operator's unit driver 121 in a manner which will be explained later in this Specification.

The signalling link 103 comprises a half duplex asynchronous balanced serial data channel (1200 baud). A half duplex signalling system is one in which it is possible to transmit in both directions, but not simultaneously. This signalling link 103 allows the transfer of information both to and from the console. The frame structure and protocols used are based on those of the International Organisation for Standardisation Draft International Standard (ISO/DIS) 3309 High Level Data Link Control (HDCC) procedure. This structure is based on the principle that frames of information which are transferred from data source to data sink are acknowledged in the opposite direction and therefore are held in memory in case they are needed for re-transmission.

The power link 102 comprises a 50V dc feed from the switching machine power supply. The other dc requirements for the console are derived by dc-dc conversion units referenced 112 within the console. This particular arrangement of power supplies is used because in most PABXs a standby power supply at 50V is provided in case of mains failure, and this arrangement also enables the console to be independent of mains failure.

The console link circuit 105 provides the interface between the signalling link 103 and the console. Its main function is to accept data characters from the central processing unit 106 in parallel format and convert them into a serial data stream for transmission. Similarly, it receives serial data streams from the signalling link 103 and converts them into parallel data characters for the central processor unit 106. The link circuit also includes line drivers, receivers and buffers for the parallel and serial data. Use is made of Intel 8251 programmable communication interface chip for the main part of the link circuit; this is shown in more detail in FIG. 4.

The keypad 107 is a capacitive touch keypad unit with associated logic, and provides a seven-bit ASCII coded output with a strobe pulse. The layout of the keypad will be discussed later in the Specification with reference to FIG. 2.

The alphanumeric visual display 108 comprises sixty-four characters organised in four rows of sixteen characters each. Each character is produced from a $5 \times 7$ phosphor dot matrix, five dots horizontally and seven dots vertically. Each dot is situated at the intersection of a horizontal and a vertical (row and column respectively) element of a conductive matrix. Each dot is energized by applying a suitable potential between the respective horizontal and vertical elements. Half the required voltage may be applied to the individual elements, so that the full voltage is only applied to the dot at the intersection of both the driven elements. The display is scanned by sequentially energising the column elements, and energising the row elements in accordance with data held in the random access memories of the console as will be described later. The visual display unit is driven by a display drive unit 109. The link circuit 105, touch keypad 107, display drive 109, and the memory 110 are linked to the central processing unit 106 by means of an address bus 122 and a data bus 123. Also attached to the address bus 122 are the operator's unit driver 121, and a further driver 113 which drives light emitting diodes for lamp indications on the console and tone generators for alarm signals. The CPU is constructed around an Intel 8048 chip. Further details of the operation will be provided later with reference to FIG. 4.

Figure 2:
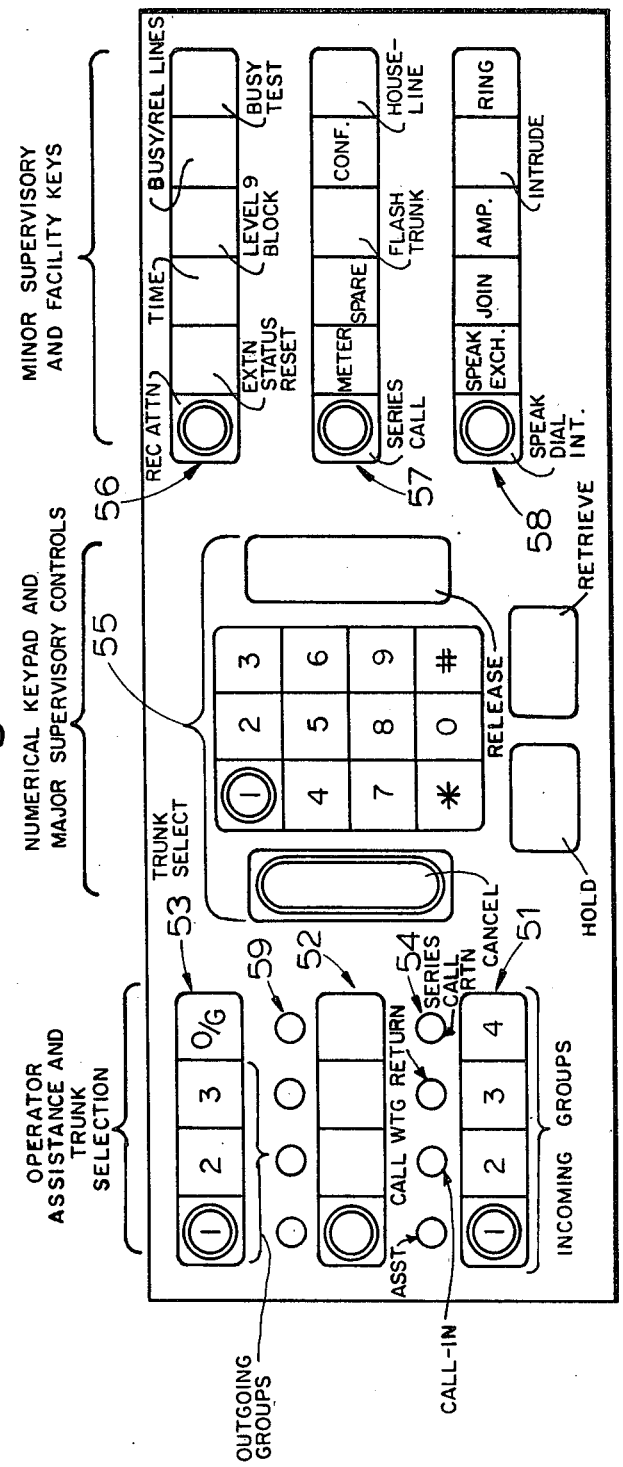
FIG. 2 is a diagram of the keyboard layout of a PABX console

Referring now to FIG. 2, this shows a possible layout of the keypad, reference 107 in FIG. 1. It will be remembered that the console is being described as it would be used for an operator's console in a small PABX.

The external lines from the PABX would be split into up to four groups, both incoming and outgoing. This allows for inter-PBX routes to be provided. Both-way lines are treated as two unidirectional lines so that they can be included in the arrangement. This also reduces the chances of congestion when extending an incoming public exchange call, for example, via an inter-PBX extension.

As will be seen in FIG. 2 the basic layout of the keypad divides it into three functional sections. On the left-hand side are provided signals and keys for all trunk selection and operator assistance functions, in the centre are the numerical keypad and the major supervisory controls (CANCEL, RELEASE, HOLD and RETRIEVE) and on the right-hand side are the minor supervisory and facility keys. It is envisaged that the fingerplate for the keyboard will consist of a thin sheet of plastic with the key designations inscribed on it covered by a thicker sheet of plastic with cutouts corresponding to the key positions. The operation of the keyboard would be by the capacitive effect of a finger placed in contact with the thinner sheet through the hole in the upper thicker sheet. This arrangement avoids the problems associated with the engraving of concave depressions in the fingerplate, and also enables special markings and arrangement of keys to be easily accommodated, merely by changing the thin sheet containing the key designations. It is envisaged as well that left- and right-handed versions of the keyboard could easily be prepared, using replacement designation sheets since the arrangement is almost totally symmetrical. If the designations of any keys are changed of course it would only require amendment of the console memory to enable the alternative arrangement to operate correctly.

A night service switch and controls for audible alarms and electroluminescent display brightness would be mounted on the side of the console. Turning now in detail to the key arrangements, keybank 53 comprises outgoing groups and trunk select keys. These are used for seizing trunks for originating calls and up to four groups of trunks can be provided as was mentioned previously. For example, there could be one group of exchange lines and three groups of inter-PBX lines. The TRUNK SELECT key allows the operator to seize any one specified trunk and it must be followed by the appropriate two-digit code keyed in the main numerical keypad specifying the required trunk.

Keybank 52 contains four keys. The assistance key (ASST) is used for answering assistance calls from extensions. These are often referred to in telephone jargon as 'level O'calls, as a relic of Strowger terminology. The operator call in (CALL IN) is used for answering calls to the operator made by extensions engaged on trunk calls, or calls automatically re-routed to the console by the exchange because some extension mis-operation has occurred. The call waiting return (CALL WTG RETURN) is used for answering calls which have been extended to busy or free extensions and which have been returned to the console after having been unanswered for thirty seconds. This is one facility that is not commonly provided at present which can easily be provided by this console and the associated equipment. The series call return (SERIES CALL RTN) key is used for answering series calls which have returned to the switchboard following release of the previous call in the series. The fact that a call is a series call would be indicated to the exchange by the operator operating the appropriate key as will be explained below at the start of the calls.

Keybank 51 comprises the incoming groups keys. These keys are used for answering incoming calls, the groups being split in a similar manner to the groups of outgoing lines. The incoming inter-PBX lines could be manually terminated, in which case every call would have to be connected via the operator, or might be automatic, in which case if the caller required operator assistance he would dial (or key) the appropriate assistance code, in which case he would also be routed for operator assistance.

Referring now to the central block of keys 55, these consist of the numerical keypad, a CANCEL key, a RELEASE key, a HOLD key and a RETRIEVE key. The CANCEL key is used to break down any connection set up by the operator. Since it will break down any connection set up by the operator it can be used after any mistake to cancel the action taken up to that time. The RELEASE key is used by the operator to withdraw from a connection. The HOLD key is used to hold a connection not fully completed in order to allow other calls to be handled, and the RETRIEVE key is used to recall calls which have been held. The numerical keyboard, is of the conventional type used in modern telephone systems and will not be described further.

Turning now to the right-hand side of the keyboard, the three banks of keys 56, 57 and 58 will be briefly described. Keybank 56 includes a receiving attention key (REC ATTN); this key is used in conjunction with the alarm facilities to acknowledge an audible alarm and provide a continuing reminder that the alarm has been cancelled until remedial action is taken. The extension status re-set (EXTN STATUS RESET) key cancels certain extension-controlled facilities which could prevent calls being terminated at any particular extension. This key would be used, for example, during a maintenance visit or before switching to night service where the inability to terminate calls at certain extensions would be inconvenient. The TIME key provides a display of the time on the visual display unit, which will be described later. It is possible that the console will be provided with a receiver and decoder for the 60kHz MSF time code transmission from Rugby. The LEVEL 9 BLOCK key is provided so that the operator can gain priority access to an outgoing exchange line, or over a longer period can allow her to bar exchange line access to certain extensions normally allowed such calls. The term 'level 9' originates of course from Strowger terminology and there is no reason why this particular code must be used in a modern system.

The BUSY/REL LINES key allows the operator to manually busy or release lines in conjunction with the numerical keypad. On depression of the key those lines that had been busied would be displayed and keying of a particular number on the keypad would cyclically alter the state of the particular line to busy and free according as it was not displayed or displayed respectively on the screen. The BUSY TEST key causes all busy trunks to be displayed while it is operated.

Turning to the keybank 57, the SERIES CALL key allows an incoming exchange line caller who requires a number of connections to different extensions to be returned to the switchboard after each call has finished. The METER key is used for metering outgoing calls set up by the operator and for reading meter units on complete calls. The FLASH TRUNK key is used to present a disconnection of the loop on an outgoing exchange call thus re-connecting public exchange dial tone or "flashing" the public exchange operator on trunk calls connected via the operator. It is equivalent to the switch hook on an ordinary telephone. The conference (CONF) key is used to set up operator controlled conference calls. The HOUSE LINE key when depressed acts as an off-hook key which provides the operator with an individual extension line appearance on the PABX, offering perhaps limited facilities. This key is used in conjunction with the numerical keypad.

The keys in keybank 58 will now be briefly described. The SPEAK/DIAL INTERNAL key allows the operator to speak privately to the extension on an established outgoing call and to dial the extension on a reverted outgoing call. The term reverted will be known to those skilled in the art as meaning a call where the extension user is to be called by the operator when the call has been set up rather than the extension user calling the operator and waiting on the line while the connection is made. The SPEAK EXCH key allows the operator to speak privately to the external party on an established outgoing call. The JOIN key is used in conjunction with the SPEAK EXCH and SPEAK/DIAL INT keys to join all three parties in a conversation on an established outgoing call. The AMP key is used to amplify the receive portion of an outside call. The INTRUDE key allows the operator to intrude on an established connection to offer, for example, an urgent trunk or international call. It would be used in connection with the numerical keyboard. The RING key can be used to ring an extension which has cleared prematurely or to re-ring a manually terminated inter-PBX call. It will be appreciated that the normal ringing of extensions is done automatically.

Figure 3:
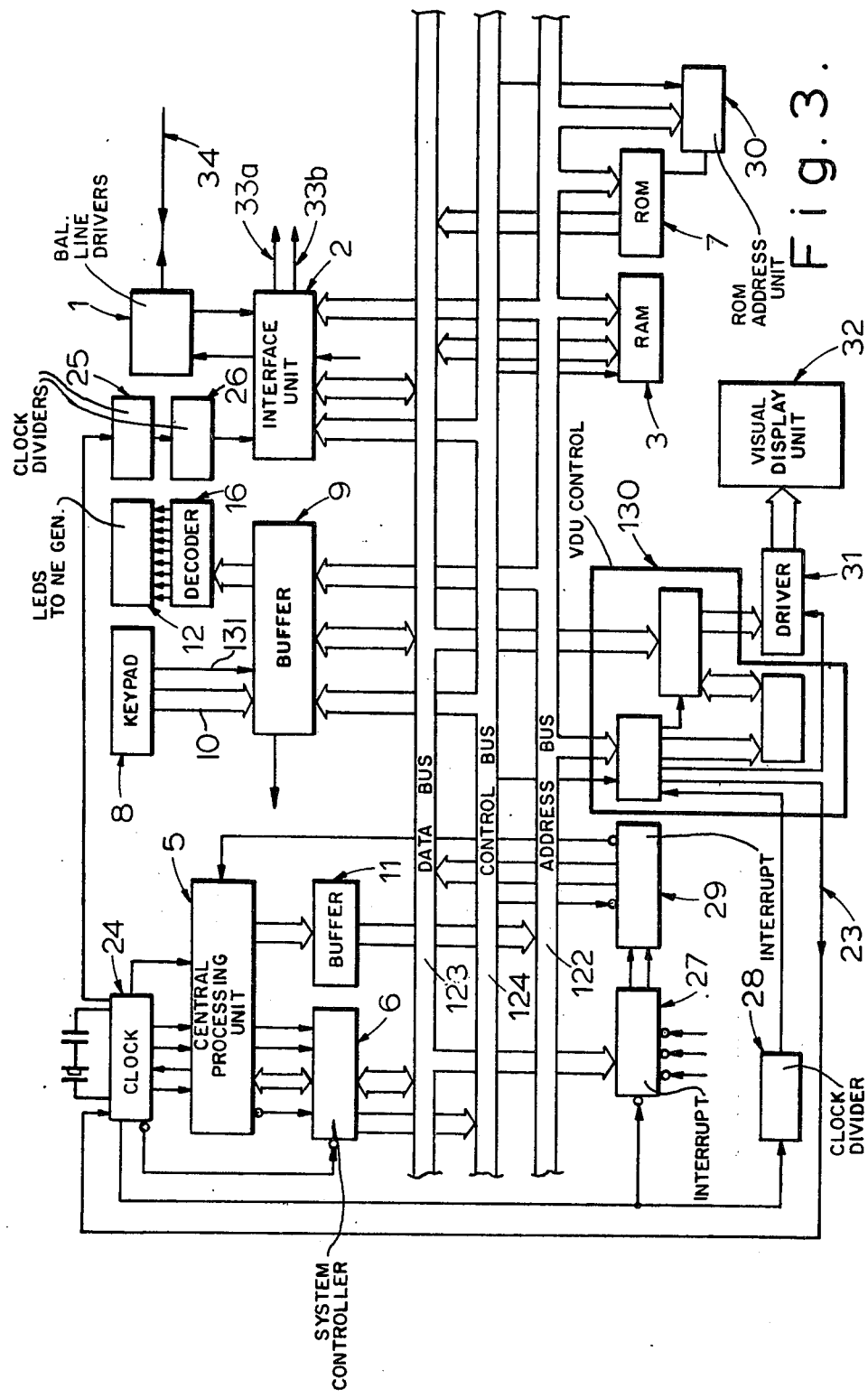
FIG. 3 is a block diagram in greater detail of a PABX operator's console

The console and processor configuration, together with the operation of the VDU, will now be described in more detail with reference to FIG. 3. Referring to FIG. 3, it will be seen that the main interconnection of the units of the console is by way of three buses, a data bus 123, control bus 124, and an address bus 122. The units of the console can be conveniently divided into groups. First of all there is the central processor group comprising the central processing unit 5, the system controller 6 and the buffer 11. There is then the unit providing interaction with the operator including the keypad 8, the decoder 16, the LED array, tone generators and drivers 12 and the buffer unit 9. It will be noted that the units do not correspond exactly with the block diagram shown in FIG. 1; this is because the block diagram was shown in terms of functions whereas FIG. 3 is in terms of actual hardware.

The input/output interface or line unit consists of clock divider circuits 25 and 26, balanced line drivers 1 and interface unit 2. The memory unit consists of random access memory 3, read only memory 7 and read only memory address unit 30. The visual display unit includes a VDU driver 31 and the VDU display itself 32. The VDU control 130 will be explained in greater detail later. Finally there is the interrupt circuitry comprising units 27 and 29, and a clock 24. Unit 28 provides a divided down clock signal to the VDU control. Data being received by or transmitted by the console passes to line from balanced line drivers 1. These units are controlled by an interface unit 2 which is an Intel USART 8251. This chip generates interrupts on lines 33a and 33b performs parallel to serial conversion, is programmable by the central processor 5, inserts parity bits and puts data bits into a format suitable for transmission or strips data bits from the incoming format. The central processor unit can generate a command word which determines the operational format of unit 2, eg, the number of start bits, the number of stop bits, whether the device is to work on odd or even parity and also the transmission rate. The format used for transmission of data over the line 34 to the control unit of the telephone exchange consists of a number of start bits followed by the data bits followed by the parity bits followed by a number of stop bits. The start bits and stop bits identify the beginning and end of a data word. All data are split into data classes, and each data word contains class identifying bits, the central processor unit identifies the data by the data class bits and can then determine what to do with a particular data word.

Incoming data on line 34 pass via the balanced line drivers into interface unit 2 where it is stored in a buffer. Interface unit 2 generates an interrupt on line 33a which causes the central processor unit to address interface unit 2 on address bus 122 and send a read signal on control bus 124. This causes the buffered information in interface unit 2 to be put on the data bus 123, after an interrupt acknowledgement signal has been received by interface unit 2, and fed into the central processor unit 5 via controller 6. The interrupt also causes instructions for dealing with the incoming data to be fed from read only memory 7, which contains the console program, into the central processor unit 5. The central processor unit identifies the class of data and the action to be taken. If data needs to be stored as it does in the majority of cases, the data, possibly in modified form, are passed to the data bus 123 via the system control 6 and then into random access memory 3. It should be noted that read only memory 7 consists of four Intel 8708 chips and has a capacity of 4k×8 bits. The address unit 30 is an Intel chip 8205 and is a decoder which assists in addressing the programs that comprise the four individual chips. The random access memory 3 comprises two Intel chips 8111, and has a capacity of 256×8 bits.

When information is fed to the central processor from the keypad, a strobe on line 131 acts as an interrupt to inform buffer 9 that data from the keypad 8 are ready for transmission, and that the data channel 10 can be accessed. Buffer 9 then generates an interrupt which alerts the central processor unit 5, via the interrupt control units 27 and 29. On receipt of an interrupt acknowledgement, data are placed on data bus 123 and pass to the central processor unit 5 via unit 6. The interrupt also fetches the appropriate instruction from read only memory 7. The central processor unit 5 processes the data and stores any resultant data in the random access memory 3, if necessary.

Unit 11 is an address buffer which enables the central processor unit to cope with the amount of random access memory used in the system. It also enables the central processor unit and the random access memory to operate at different speeds.

Data can be generated by the central processor unit 5 and thence passed out to data bus 123. Such data are generated as a result of incoming data on line 34 or by keypad depression or by a low priority supervisory program which includes diagnostics and fault checks. These data which are output by the central processor unit 5 go either to the operator signal array 12 which includes light emitting diodes to provide the lamp indications and audio alarms or they are output to the telephone exchange control by way of line 34 or they are fed to the visual display unit or they are fed into the random access memory 3.

The operator signal array 12 includes the array of LEDs 54 and 59 in FIG. 2 on the console, together with audio alarms. Audio alarms may include a short tone bleep emitted when a key is operated by the capacity effect of the human body to give feed-back to the operator to indicate that data have been entered. The operation of the LEDs and the circumstances in which they light will be obvious from the description previously given of the keyboard. The light emitting diode will indicate to the operator that the circuit with which it is associated requires attention. The unit 12 is activated by the central processor unit 5 when an address signal is sent via the address bus 122 to the buffer 9. At the same time a write signal is placed on the control bus 124 and data are output from the central processor unit 5 via controller 6 on to the data bus 123 and is then written into buffer unit 9. These data are then fed direct via the decoder 16 to the unit 12.

Figure 4:
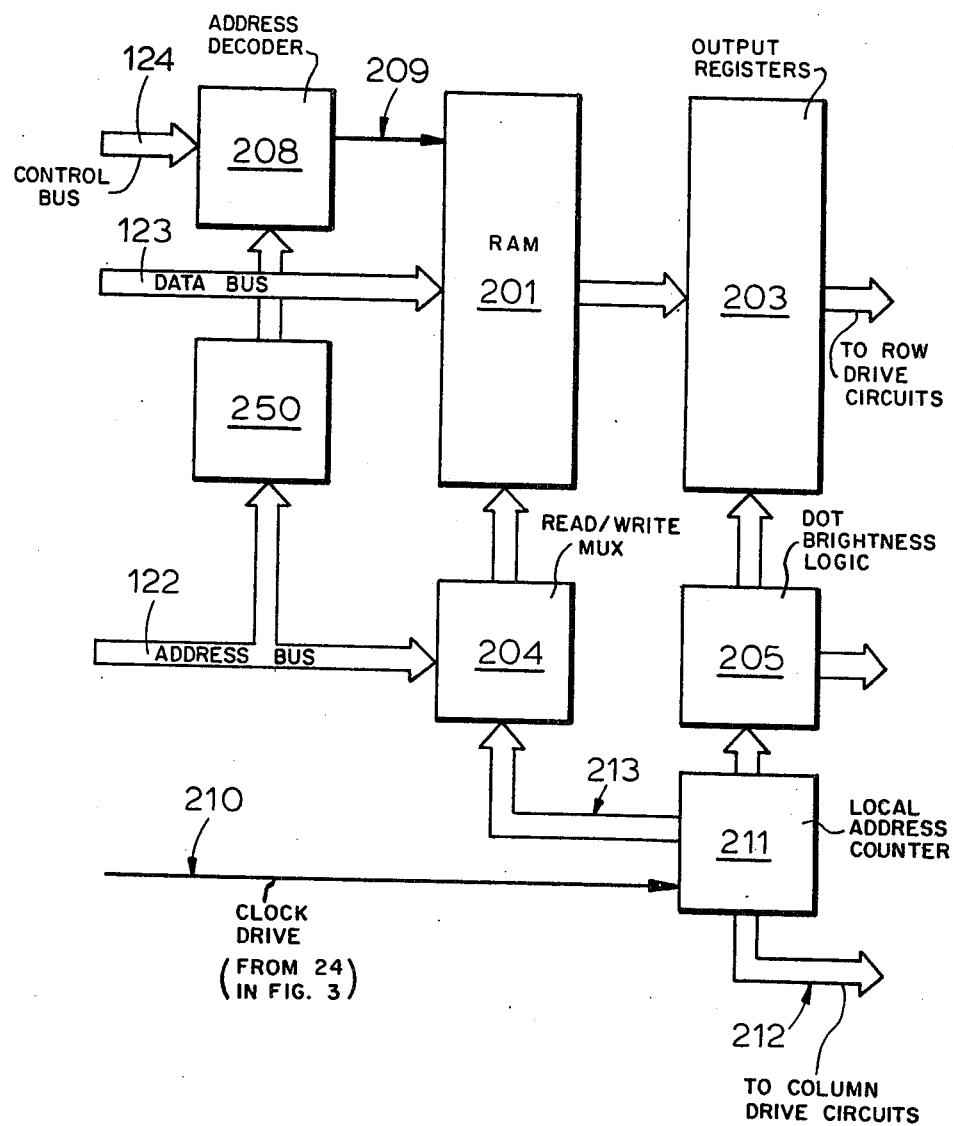
FIG. 4 is a block diagram of a visual display unit control for use for use in a PABX operator's console.

The visual display unit and the drive form an important part of the telephone control console and therefore will be described in more detail with reference to FIG. 4 which shows in block diagram form the contents of the VDU control 130 in FIG. 3. The operation of the visual display unit and its associated memory can be divided into two parts. As was explained earlier in this Specification, the visual display unit operates by scanning a series of column drive elements and applying data instructions to a series of row elements so that the dots at the intersections of driven elements are activated. The first requirement for the VDU data and drive circuits is therefore to provide a continuing refresh facility in synchronism with the column scan so that the information required to be displayed on the screen can be continually refreshed. This requires that the random access memory 201 which stores the data is constantly addressed in the read mode in sequence and the data are transferred to the VDU row drive circuit. The addressing of the random access memory has to be in synchronism with the column drive circuits. The second requirement is that the data displayed can be changed and up-dated. This means that the random access memory 201 must have facilities to receive data from the central processing unit and write them into the appropriate storage locations.

A clock drive 210 from the main clock of the console referenced 24 in FIG. 3 drives a local address counter 211 which is a mixed binary and binary coded decimal counter. The mixed counting is because the VDU column drive circuitry uses, in the particular embodiment being described, Nixie (RTM) tubes and these are designed to work with binary coded decimal addressing.

The local address counter 211 supplies drives to the VDU column drive circuits along output 212, to the read-write multiplexers 204 by output path 213 and also a drive, which will be explained in more detail later, to the dot brightness logic 205. The read-write multiplexer 204 selects inputs either from the processor address bus 122 or the local address counter input 213. This is done under the control of a processor select wire from the central processor unit which has a signal applied when an address is to be read from the processor address bus. The appropriate address is then read into the random access memory 201. In the normal state the random access memory 201 is set to the read condition, and the data from the appropriate storage locations is read out on to the output registers 203. The organisation of the reading out of the data is not straightforward and will be described in detail later. At this stage all that is necessary to understand is that the data is presented as a parallel word of bits to the row drive circuits, each bit corresponding to a dot being on or off in the given row of the driven column. The dot brightness logic 205 includes a gating arrangement for the output registers 203 and also for the VDU column drive whereby the columns and rows of the VDU display are only driven for a selected fraction of the cycle time. This enables a variation in the apparent brightness to be achieved. The dot brightness logic achieves this gating by counting one of a pre-selected number of clock pulses following a synchronisation signal included in the drive from the local address counter mentioned earlier in the Specification. The reading of data into the random access memory 201 from the central processor unit is also fairly easily organised. The method by which the read only memory is addressed has been described, and address decoder 208 is arranged to detect when a valid address of the random access memory 201 appears on the address bus 122 and to provide a signal to the read-write logic 250 when this occurs. This signal is gated with an internal ready signal which is derived in a manner explained later, and a signal from the central processor unit on the control bus 124 to alter the signal on path 209 to enable the random access memory to read the data which is then input on the data bus 123. The ready signal produced in the read-write logic unit 208 is used as a signal to the central processing unit that data may be fed in via the data bus 123. The internal ready signal is generated in the dot brightness logic unit 205 (the path by which it is transferred to the read-write logic unit is not shown in FIG. 5). This internal ready signal indicates that the random access memory 201 is in a state to receive incoming data to be written therein. The random access memory 201 works in a cyclic basis as will be explained later, and the dot brightness logic is arranged to produce an internal ready signal except during a time window extending from a short time before the random access memory enters a read period in the cyclic process and the time when the reading out of the data has finished. Thus at any time outside this time window data can be read in from the central processor unit in the manner hereinbefore described.

Turning now to FIG. 5, the organisation of the storage of data within the random access memory 201 will be described. In FIG. 5 is shown the random access memory 201 and within it the four identical units 301, 302, 303 and 304 from which it is built up. There is also shown at 305 a diagrammatic representation of a portion of the visual display unit screen which is arranged to display four rows of sixteen characters, each character (the top left-hand one being referenced 306) being composed of a 5×7 matrix of dots as shown in the FIG. These dots correspond with the dots on the visual display unit screen. It will thus be seen that when any one column is being scanned a total of 4×7=28 bits of data have to be read out of the random access memory 201 to provide the signals to control the energisation of the twenty-eight row elements and thus the twenty-eight dots comprising the respective column.

Figure 6:
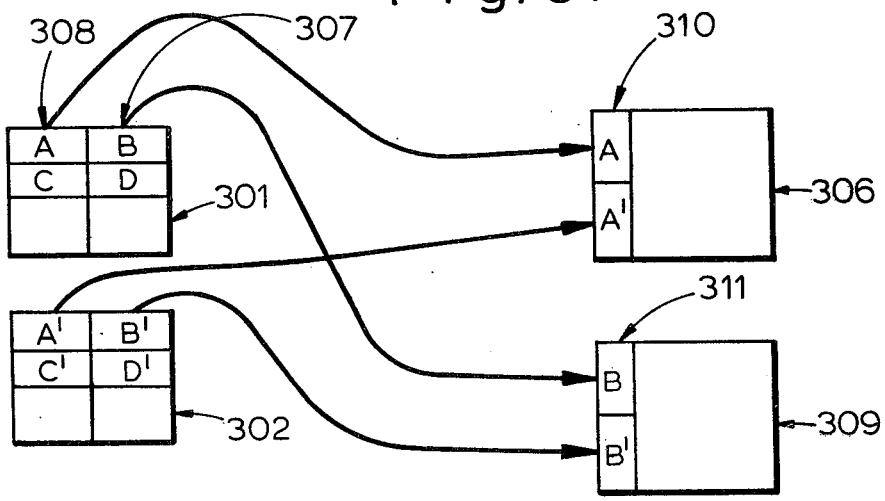

However, the random access memories 301 to 304 from which the overall unit 201 is constructed are not organised on a basis that enables twenty-eight bits of data to be read out from any one storage location. Referring now to FIG. 6, the layout of the storage locations corresponding to individual characters will be described so that the operation of the controls for the random access memory 201 can then be explained. Random access memories 301 and 302 contain the data corresponding to two character rows of the Visual display unit display. Similarly, the units 303 and 304 contain the data for the other two character rows, and therefore the description will be confined to the memories 301 and 302, that for the other memories being identical in outline. In FIG. 6 there are shown the two random access memories 301 and 302 and two characters of two character rows of the visual display unit display 306 and 309. Each random access memory 301 and 302 is organised so that each separately addressed storage location contains four data bits. The storage locations are divided between two sub-portions of the random access memories so that all the storage locations in one half have the most significant bit of their address zero and the other half have the most significant bit of their address as 1. In FIG. 6 the two sub-portions of the random access memory 301 are labelled 307 and 308, and two of in any storage locations within each of the sub-portions have been lettered. The locations in sub-portion 308 are labelled A and C and those in sub-portion 307 are labelled B and D. Each sub-portion of each random access memory contains 128 four-bit storage locations. The storage locations in random access memory 302 corresponding to those lettered in 301 have been labelled with the same letters of the alphabet distinguished by primes. Turning now to the two characters 306 and 309 it will be remembered that the data has to be presented to these in the form of a fourteen-bit parallel word for each column, there being seven bits in each column of each character. The arrangement chosen is that two four-bit words, having therefore one spare bit, are used to provide the information for each seven-bit character column. The arrangement is that the four bits contained in storage location A contain the data for the top four bits of the first column of the character 306 and the four bits contained in the storage location A' of random access memory 302 provide the three bits of data for the lower portion of the first column of character 306. The last bit of storage location A' will therefore be a zero. The storage locations B and B' then provide the data, in a similar way for the first column of character 309. The process is repeated for the succeeding columns using, for example, storage locations C and C' and D and D' and so on until all the eighty columns have been displayed The process then starts from column 1 again.

It will be appreciated that the full storage capacity of the random access memories is not used in this way since there are 4096 bits of storage capacity and only 2240 bits of information appear on the screen. The spare space is in fact evenly distributed through the random access memories because it will be remembered that the addressing is in binary coded decimal because of the type of column drives used.

Figure 7:
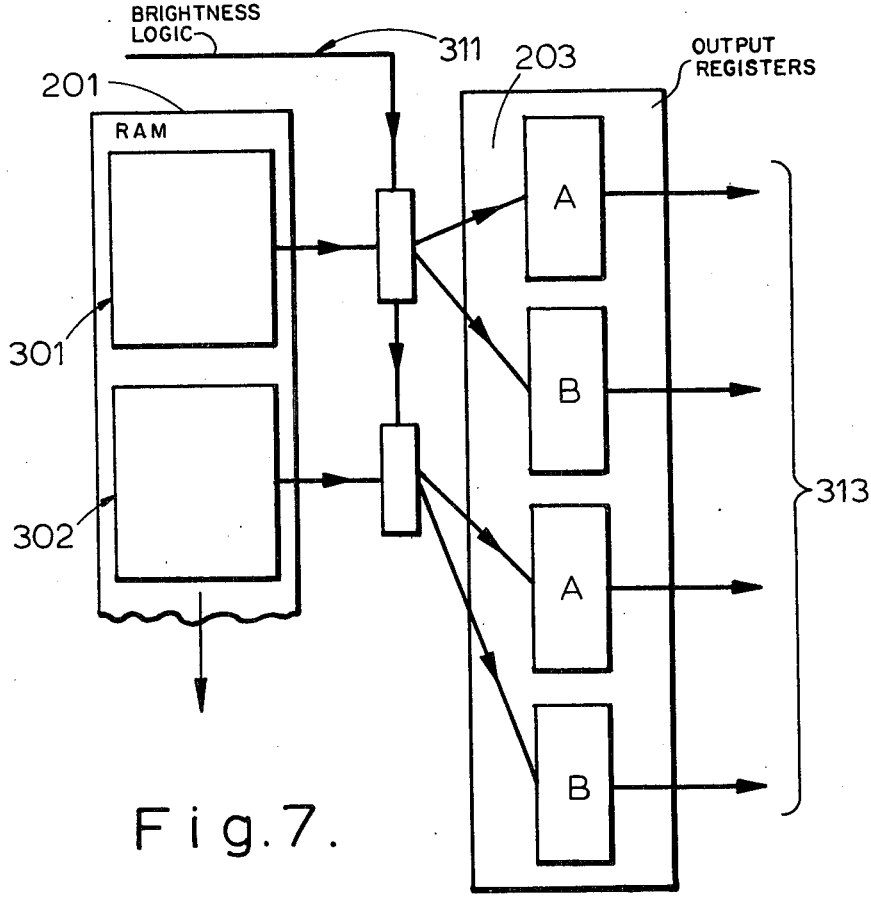

Referring now to FIG. 7, the electronic arrangement to provide the drive to the visual display unit will now be described. It will have been noticed from the preceding description that each column requires eight storage locations from all four individual random access memories within the main random access memory. It is impracticable to read out from more than one location in each random access memory simultaneously, so it is necessary to provide an output register on to which the data are assembled by sequential reading out and can then be transferred in parallel to the VDU row drive circuits. The assembly and gating of the data onward to the visual display unit drive circuits is the job of the output registers 203. The random access memories 301 and 302 are shown and the data are fed from these to the output register 203 under control of a latch odd-latch even signal on line 31 generated by the dot brightness logic which it will be remembered receives a synchronising pulse and clock pulses from the local address counter, and can therefore gate the latching at the appropriate time in the cycle. The sequence of operations during the complete cycle by which one column is read out will now be briefly described. The local address counter will be assumed just to have counted on to the next address. This address will be passed to the read-write multiplexes and thence to the RAM 201. The address will in fact be fed in parallel to each of the four individual RAMs contained therein and thus each RAM will output the data stored in one storage location on to the first portions of the output register 203 labelled A. Gates 312 and 313 receive the register add signal from the dot on logic via line 311 and so feed the data to the right portions of the output register 203. Because of the way in which the sub-portions of the random access memories have been arranged it is now only necessary to change the most significant bit of the address to access the four corresponding storage locations in the second sub-portions of each of the RAMs. This is done, but at the same time the register drive logic produces the register even signal on lead 311 and the data read out is fed into the storage locations B because the gates 312 and 312 have been set to direct the data in this way by the register odd signal. The dot brightness logic then causes the rows and columns of the VDU drive to be energised reading out the data from the output register 203 in parallel on the leads 313. The length of time for which the columns and rows are energised is controlled by the dot on logic as has been previously described in response to a manual control to determine the brightness. After the rows and columns have been de-energised a synchronisation signal is produced which clears the register and the logic is then ready for a further cycle. Each cycle takes about 31.25µs to complete giving a total time to refresh all eighty columns of the VDU of 2.5ms. The period during which the VDU screen is energised for each column can be varied between 8 and 24µs, and 2.2µs are engaged each time the random access memory is read.

We claim:

1. An operator's telephone control console for use in conjunction with a computer controlled telephone switching central processing unit, said control console including:
   visual indicator means for visually displaying telephone switching information to an operator;
   data input means for manually entering telephone switching control information;
   audio frequency input and output means for establishing audio communication between an operator and said central processing unit;
   microprocessor means connected to cooperate with said visual indicator means, said data input means and said audio frequency input and output means to facilitate control of telephone switching operations by an operator in conjunction with said central processing unit;
   data transmission and reception means connected to establish a digital communication link between said microprocessor means and said central processing unit for controlling telephone switching;
   wherein said microprocessor means controls at least some of said visual indicator means in accordance with data received by said data reception means from the central processing unit and in accordance with data input manually through said data input means and also controls the transmission of digital data by said data transmission means in accordance with the operator's instructions as received from said data input means and wherein said audio-frequency input and output means include an input and output for an operator's telephone.

2. An operator's telephone control console as claimed in claim 1, wherein said visual indicator means includes lamp signals.

3. An operator's telephone control console as claimed in claim 1 wherein said visual indicator means includes a visual display unit.

4. An operator's telephone control console as claimed in claim 3, wherein said visual display unit comprises an electroluminescent alpha-numeric display.

5. An operator's telephone control console as claimed in claim 1 wherein said data input means comprises a keyboard.

6. An operator's telephone control console as claimed in claim 1 wherein said data input means comprises a keyboard having keys activated by the close proximity of a portion of the human body sufficient to produce a detectable change in capacitance.

7. An operator's telephone control console as claimed in claim 1 wherein said data transmission and reception means transmit and receive digital data, via a data channel, to and from said central processing unit having control of a telephone exchange and wherein said audio frequency input and output means is connected by at least one further channel to a telephone line input of said telephone exchange, whereby telephonic communication may be provided to and from said operator's telephone and control of at least some operations of said telephone exchange is in accordance with data transmitted by said data transmission and reception means.

8. An operator's telephone control console as claimed in claim 7 wherein said visual indicator means can display information relating to the operation of said telephone exchange.

9. An operator's telephone control console as claimed in claim 8 wherein the displayed information includes the class of service of telephones connected to said telephone exchange.

10. An operator's telephone control console as claimed in claim 8 wherein the displayed information includes details of the equipment or circuits used in connecting particular calls.

11. An operator's telephone control console as claimed in claim 7 wherein the operations of the telephone exchange controlled in accordance with digital data transmitted by said data transmission and reception means include operations to detect and identify faulty elements and incorrect operation of said telephone exchange.

12. An operator's telephone control console as claimed in claim 1 in which the visual indicator means can display numeric information input by the operator for the purpose of setting up a telephone connection through said data input means.

13. An operator's telephone control console as claimed in claim 12 further including a digital data transmission and reception means connected by a digital data transmission channel to said central control unit in an associated telephone exchange and also connected to said address and data buses, so that, in operation, transmission of data between said console and said central control unit is controlled by said microprocessor.

14. An operator's telephone control console for use in conjunction with a central telephone switching control unit, said console including:
a signalling keypad for setting up telephone connections,
a microprocessor connected to receive an operator's telephone switching instructions from said keypad, to carry out such instructions and to communicate correspondingly with the central telephone switching control unit as required to effectuate the desired switching operations,
an address bus and a data bus interconnecting said microprocessor and said keypad so that the signalling output of said keypad is by way of said data bus and is at least partially controlled by signals from said microprocessor to said keypad by way of said address bus.

15. An operator's telephone control console as claimed in claim 14 in which said keypad comprises keys activated by the close proximity of a portion of the human body sufficient to produce a detectable change in capacitance.

16. An operator's telephone control console as claimed in claim 13 further including one or more driver circuits connected to said address bus and adapted to control lamp signals in said console in accordance with signals transmitted from said microprocessor by way of said address bus.

17. An operator's telephone control console as claimed in claim 13 further including one or more driver circuits connected to said address bus and adapted to control tone generators in said console in accordance with signals transmitted from said microprocessor by way of said address bus.

18. An operator's telephone control console as claimed in claim 13 further including one or more driver circuits connected to said address bus and adapted to control the switching of one or more audio circuits within said console in accordance with signals transmitted from said microporcessor by way of said address bus.

19. A data store for storing data to be displayed by a visual display unit in a telephone control console comprising:
a plurality of pairs of random access memories,
each of said memories having a plurality of addressable storage locations,
said storage locations being arranged in pairs such that the addresses of the locations in each pair differ only in the most significant bit of the respective addresses, and
means for assembling a parallel plurality of parallel words on an output register, each said word comprising the contents of similarly addressed locations in each pair of memories, adjacent words being sequentially assembled by the alteration only of the most significant bit of the address during the assembly of each said parallel plurality of parallel words.

20. A data store as claimed in claim 19 wherein said means for assembling includes means which operates cyclicly to assemble a sequence of words on said output register and including means for altering the data stored in said memories of at least one interval in each cycle.

21. A data store as claimed in claim 20 including means for defining said interval by a time window during which said words are not being assembled and are not just about to be assembled onto said register.

22. A data store as claimed in claim 20 including means for changing the data in said random access memories only when a write signal is present, said write signal being derived when a signal defining said time window and a signal indicating that a valid storage location is being addressed are both present.

23. A visual display unit control for use with a dot matrix visual display unit in a telephone control console having column and row drives actuating the columns of said matrix in a scanning sequence and said row drives actuating the rows of said matrix in accordance with data stored in said control, so that a dot situated at the intersection of an activated row and an activated column is activated said control, said visual display unit control including:
at least a first and a second random access memory to store said data,
a register connected to receive the output from said memories to said row drives and to assemble thereon a parallel word comprising four portions, the first portion being from a storage location in the first memory having a first address, the second portion being from a storage location in the first memory having a second address, the third portion being from a storage location in the second memory having a first address, and the fourth portion being from a storage location in the second memory having a second address, and where said first and second addresses differ only in the most significant bit, said register being connected to assemble data from locations having the second address after data from the locations having the first address, said addresses having the remaining bits selected in a cyclic manner by an address counter synchronized with said column drives.

24. A visual display unit control as claimed in claim 23 including means to define, by a signal, during each cycle, a period during which data is not being and is not about to be assembled on said register, is available to alter the data stored in the memories.

25. A visual display unit control as claimed in claim 23 including means to permit data to be altered in said memories only when a write signal is present, said write signal being produced by the simultaneous presence of said signal defining said period and a second signal indicating that a valid memory address has been selected.

26. A visual display unit control as claimed in claim 23 wherein the luminance of said display is controlled by the ratio of the periods of activation of said dots to the period of non-activation.

27. A visual display unit control as claimed in claim 24 including means for controlling said periods of activation by the periods of activation of the rows and columns of said matrix.

28. A data store for storing data to be displayed by a visual display unit in a telephone control console, comprising:

a plurality of random access memories;

a plurality of storage locations n each random access memory, each said storage location having a storage capacity of n bits, where n may be different for different random access memories and is greter than one.

said storage locations being arranged into sub-portions within each random access memory, so that in use an output word can be assembled on an output register by transferring data in parallel from storage locations in first corresponding sub-portions in each said memory onto said output register, and sequentially from second and further corresponding portions in each said memory.

* * * * *